Oct. 22, 1968     E. H. TURNER     3,407,364
INTRACAVITY LASER PHASE MODULATOR
Filed April 9, 1965     2 Sheets-Sheet 1
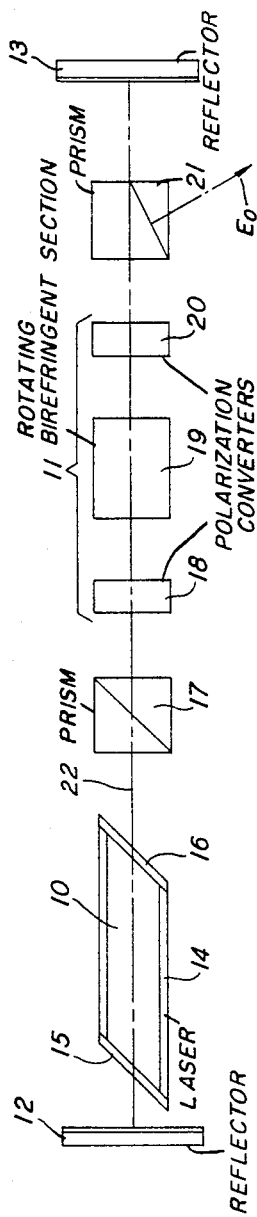
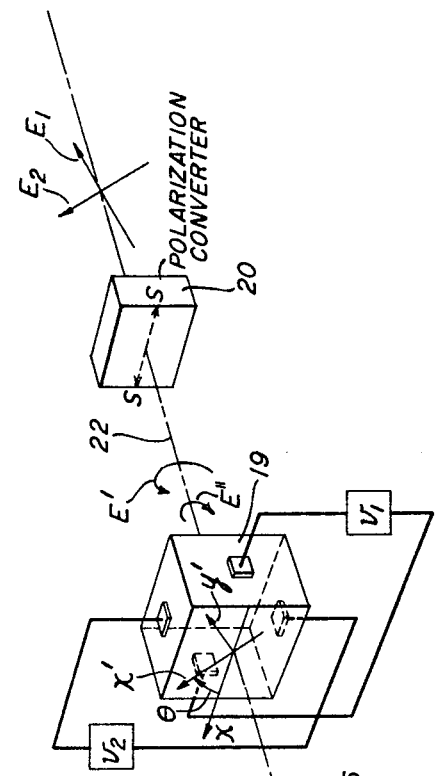
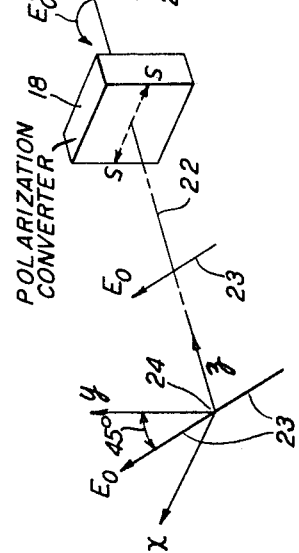
INVENTOR
E. H. TURNER
BY
Kenneth W. Mateer
ATTORNEY

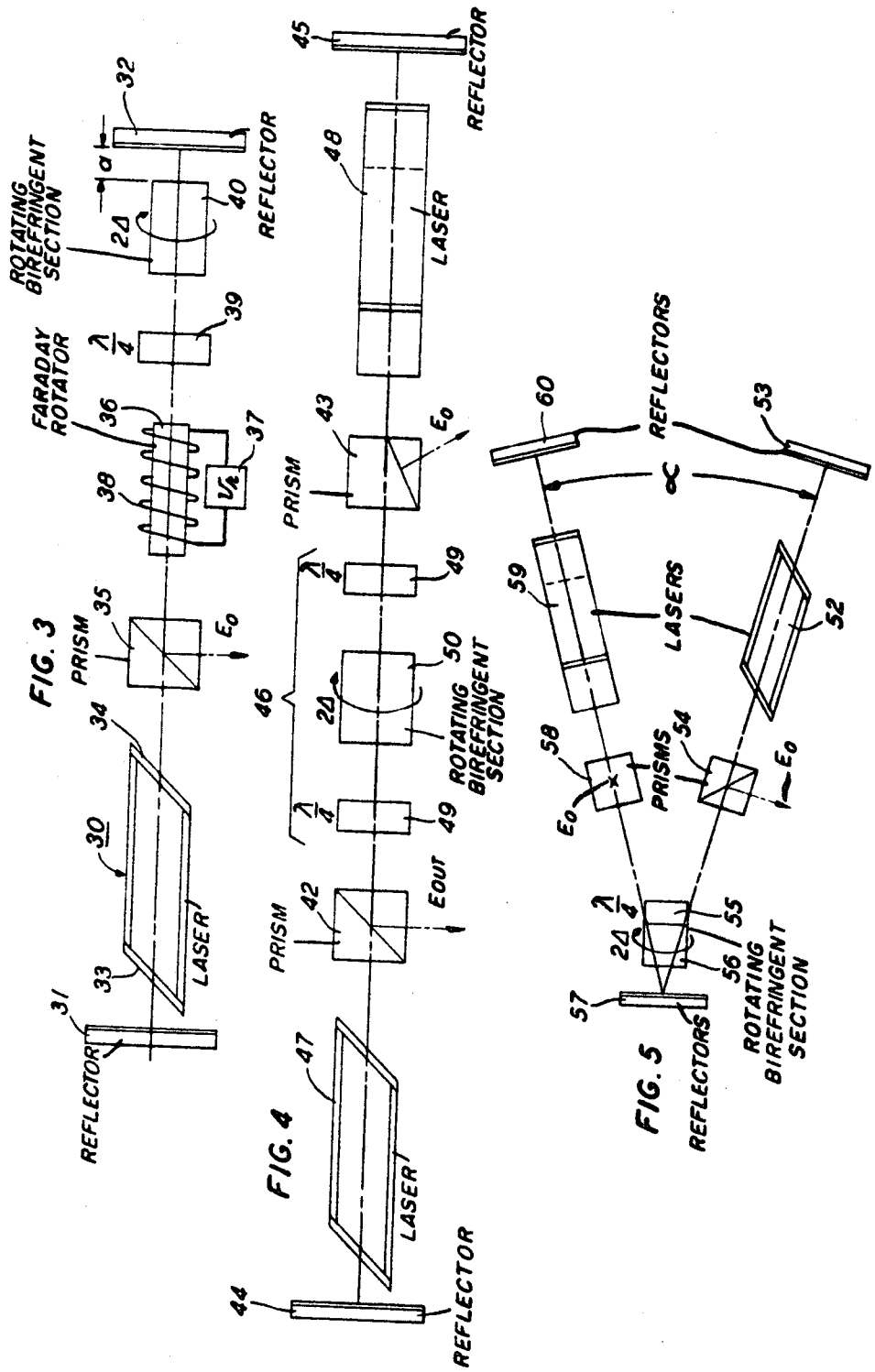

United States Patent Office 3,407,364
Patented Oct. 22, 1968

3,407,364
INTRACAVITY LASER PHASE MODULATOR
Edward H. Turner, Rumson, N.J., assignor to Bell Telephone Laboratories, Incorporated, New York, N.Y., a corporation of New York
Filed Apr. 9, 1965, Ser. No. 446,967
7 Claims. (Cl. 332—7.51)

ABSTRACT OF THE DISCLOSURE

Resonant intracavity laser modulators in which the optical waves in the preferred cavity polarization are successively incident upon a quarter wave plate having axes at 45 degrees to the polarization plane; a rotating birefringent section having a small constant differential phase delay; and a second quarter wave plate also at 45 degrees. The energy energizing from the second quarter wave plate consists of two signals having orthogonal polarizations. The first signal has an amplitude related to the magnitude of the constant differential phase delay and a phase independent of the orientation angle, or rotation, of the birefringent section. The second signal also has a constant amplitude, but a phase which is directly proportional to the rotation of the birefringent section. By applying a varying rotation field to the birefringent section, the phase, and thus the frequency, of the second signal can be controlled.

---

This invention relates to phase modulators and, more particularly, to intracavity arrangements for phase modulating laser beams.

Means for generating electromagnetic waves in the infrared, visible, and ultraviolet frequency ranges, hereinafter referred to collectively as the optical frequency range, are disclosed in United States Patent No. 3,929,922, issued Mar. 22, 1960, to A. L. Schawlow and C. H. Townes; and in the copending application of A. Javan, Ser. No. 277,651, filed May 2, 1963, and assigned to the assignee of this application.

Wave energy generated in the manner explained by Schawlow et al. and by Javan is characterized by a high degree of monochromaticity and coherence. Additionally, because of the very high frequency of wave energy in the optical portion of the frequency spectrum, such energy is potentially able to carry enormous amounts of information and is, therefore, particularly useful as a carrier wave in a communication system. However, efficient utilization of this great information carrying potential depends on the availability of means for modulating wave energy at the high frequencies involved.

Various arrangements have been priorly disclosed for amplitude modulating optical waves. However, amplitude nonlinearities in typical optical materials and typical system components introduce spurious amplitude variations producing undesirably low signal to noise ratios. In addition, the energy remaining in the cavity is itself amplitude modulated, thereby introducing problems of spurious resonances and restricted modulation bandwidths.

The signal-to-noise ratios which characterize angle modulation systems—frequency or phase—are considerably higher. The copending applications of S. E. Miller, Ser. No. 374,326, filed June 11, 1964; and E. A. Ohm, Ser. No. 425,572, filed Jan. 14, 1965, now Patent No. 3,366,792, both assigned to the assignee of this application, relate to intracavity phase modulation arrangements which overcome many of the disadvantages of amplitude modulation systems. However, even these systems, while primarily phase modulators, tend to introduce varying amounts of amplitude modulation into the optical cavity.

It is the object of the present invention to phase modulate optical wave energy within an optical cavity without simultaneously introducing amplitude modulation.

It is a further object of this invention to couple from an optical cavity a phase modulated signal of constant amplitude.

In accordance with the invention, the limitations of prior internal modulators are overcome by leaving energy in the preferred cavity polarization unaltered in amplitude and phase while generating phase modulated components in a polarization normal to the preferred polarization. These latter components are completely coupled out of the cavity before they re-enter the active medium.

More specifically, the optical waves in the preferred cavity polarization are successively incident upon a quarter wave plate having axes at 45 degrees to the polarization plane; a rotating birefringent section having a small constant differential phase delay; and a second quarter wave plate also at 45 degrees. The energy emerging from the second quarter wave plate consists of two signals having orthogonal polarizations. The first signal has an amplitude related to the magnitude of the constant differential phase delay and a phase independent of the orientation angle, or rotation, of the birefringent section. The second signal also has a constant amplitude, but a phase which is directly proportional to the rotation of the birefringent section. By applying a varying rotation field to the birefringent section, the phase, and thus the frequency, of the second signal can be controlled.

By coupling the second signal out of the cavity before it again enters the negative temperature medium, the signal energy remaining within the cavity is of constant amplitude and frequency.

In accordance with a first embodiment of the invention, laser generated energy passes sequentially through a first quarter wave plate, a rotating birefringent section, and a second quarter wave plate, all of which are disposed between polarization selective prisms which couple the modulated energy from the cavity on each pass. In a second embodiment of the invention, one quarter wave plate and one prism are eliminated and a 45 degree Faraday rotator is added. Energy is coupled out by the remaining prism after oppositely directed passes through the modulation elements, including a reflection from the cavity extremity. Additional embodiments of the invention include multiple negative temperature media and folded cavity geometries.

The above and other objects of the invention, together with its various features and advantages, will become more readily apparent upon consideration of the accompanying drawing and the detailed description thereof which follows. In the drawing:

FIG. 1 is a schematic view of an internal phase modulator in accordance with the invention;

FIG. 2 is a detailed view of the modulation section in FIG. 1; and

FIGS. 3, 4, and 5 are alternate embodiments of the modulator of FIG. 1.

Referring now in detail to the drawing, FIG. 1 is an illustrative embodiment of an internal phase modulator comprising an active medium 10 and a modulator 11 disposed within a cavity defined by reflectors 12 and 13.

Because the invention is of particular interest at optical frequencies, it is described herein in connection with optical masers, or lasers. Thus, for purposes of illustration, the active medium can be a gaseous mixture of helium and neon enclosed in an elongated tube 14. However, it is to be understood that the principles of the invention are applicable at any frequency for which a maser can be constructed and that the invention is not limited to the optical frequency band.

To minimize reflections and to polarize the laser beam, ends 15 and 16 of tube 14 are inclined at the Brewster angle with respect to the cavity axis 22. A power source, not shown, is connected to tube 14 for supplying the power necessary to produce and to maintain a population inversion within the medium. It is to be understood that the active, or negative temperature, medium can comprise materials other than a gaseous mixture of helium and neon. For a detailed discussion of lasers, see the article by A. Yariv and J. P. Gordon, entitled "The Laser," published in the January 1963 issue of the Proceedings of the Institute of Radio Engineers.

The reflectors 12 and 13, which define the laser cavity, can have plane surfaces, curved surfaces, or a combination of one plane surface and one curved surface. In the present invention, it is not necessary that at least one of the reflectors be partially transmissive since the output is derived in another way, as will be described in greater detail hereinafter.

Phase modulation of a portion of the laser beam is accomplished by means of phase modulator 11 comprising three elements, or stages 18, 19, and 20 interposed along the beam path between the active medium 10 and one of the cavity reflectors such as reflector 13 in FIG. 1.

One disadvantageous aspect of previously available electrically controlled internal phase modulators has been the introduction of amplitude variations; i.e., amplitude modulation, into the laser beam energy remaining within the cavity after the phase modulated component is coupled out. The unwanted modulation components within the resonant cavity limited the frequency and of operation by giving rise to spurious resonances.

In accordance with the present invention, phase modulation is produced without simultaneously introducing amplitude modulation by producing in the stages designated 18, 19, and 20 of FIG. 1 wave energy in a first polarization having a constant amplitude and a varying phase; and wave energy in a second polarization normal to the first polarization having a constant amplitude and a constant phase. Wave energy having the first polarization is removed from the cavity on each pass; wave energy having the second polarization remains in the cavity.

More specifically, the first stage 18 is a polarization converter for converting the beam energy, which is linearly polarized by the Brewster angle windows 15, 16 and by polarization selective prism 17, into circularly polarized energy of one sense. For purposes of discussion hereinafter the laser beam shall be considered as vertically polarized. The second stage 19 is a birefringent section with axes of constant birefringence rotating at a speed which is variable and which is determined by an applied external modulation signal. Stage 19, which introduces a constant relative phase delay considerably less than 180 degrees, produces a first circularly polarized component rotating in the same sense as the incident energy and having an amplitude equal to the cosine of the constant relative phase delay and a second circularly polarized component rotating in the opposite sense from the incident energy and having an amplitude equal to the sine of the constant relative phase delay.

Stage 20 is a polarization converter, identical to stage 18, which converts the incident oppositely rotating circularly polarized energy into two linearly polarized wave energy components of orthogonal polarization. The first component is normal to the original polarization and has a constant amplitude and a phase independent of the voltage applied to stage 19. The second component is parallel to the original polarization and has a constant amplitude and a phase dependent on the magnitude of the modulation voltage applied to stage 19.

Since the wave energy component having a phase dependent on the magnitude of the applied modulating voltage is polarized normal to the energy independent of that voltage, the former can be selectively extracted from the cavity by appropriately oriented polarization selective stage 21. This can be a Nicol prism of the type described on pages 500 to 502 of the third edition of Fundamentals of Optics by F. A. Jenkins and H. E. White, or any other means of similar function known in the art.

In FIG. 2, which is a more detailed view of modulator 11 in FIG. 1, a wave 23 of amplitude $E_0$ and angular frequency $\omega$, polarized at 45 degrees to the $x$, $y$ axes of rectangular co-ordinate system 24, propagates along axis 22 parallel to the $z$ axis and is incident upon polarization converter 18. Converter 18 is advantageously a birefringent crystal with axes oriented to produce a phase retardation along the $x$ direction which is $\pi/2$ greater than that along the $y$ direction. For example, converter 18 can be a quarter wave plate of potassium dihydrogen phosphate (KDP) with slow axis S—S oriented as illustrated.

At incidence upon plate 18 the wave can be described as $$\vec{E} = \frac{E_0}{\sqrt{2}} e^{i(\omega t - \vec{k} \cdot \vec{z})}(x + y) \qquad (1)$$

where $x$ and $y$ are unit vectors.

Wave 23 is transformed upon traversal of plate 18 into a counterclockwise rotating circularly polarized wave $E_0'$ indicated by curved arrow 25, which propagates along axis 22 toward stage 19.

Mathematically, wave 25 can be expressed as $$\vec{E} = \frac{E_0}{\sqrt{2}} e^{i(\omega t - \varphi(z))}(-ix + y) \qquad (2)$$

where the average phase length for all polarizations, written $\varphi(z)$, is unimportant to these calculations.

Stage 19 is a birefringent section with rotating axes of birefringence, conveniently defined as axes $x'$ and $y'$ at an angle $\theta$ to the fixed axes $x$ and $y$ of crystal 18. The wave component parallel to $x'$ is retarded an amount $\Delta$ and the component parallel to $y'$ is advanced an amount $\Delta$ relative to the common phase delay through the section. In terms of the primed co-ordinates Equation 2 becomes $$\vec{E} = \frac{E_0}{\sqrt{2}} e^{i(\omega t - \varphi(z))}(-ix' + y')e^{i\theta} \qquad (3)$$

After traversing element 19, $$\vec{E} = \frac{E_0}{\sqrt{2}} e^{i(\omega t - \varphi(z))}(-ix'e^{-i\Delta} + y'e^{i\Delta})e^{i\theta} \qquad (4)$$

which in the unprimed co-ordinate system is, after rearrangement of terms, $$\vec{E} = \frac{E_0}{\sqrt{2}} e^{i(\omega t - \varphi(z))}\{\cos \Delta(-ix + y) - \sin \Delta(x - iy)e^{2i\theta}\} \qquad (5)$$

By comparing Equation 5 to Equation 2 or 3, it can be seen that the wave component having the original sense of circular polarization is changed by a factor $\cos \Delta$ in amplitude and has a phase completely independent of $\theta$. There is, in addition, however, a wave component having the opposite sense of circular polarization with magnitude $\sin \Delta$ and a phase dependent on $2\theta$. These components are indicated as $E'$ and $E''$, respectively, in FIG. 2.

The waves $E'$ and $E''$ are incident upon stage 20, a quarter wave plate identical to stage 18, emerging as $$\vec{E} = \frac{E_0}{\sqrt{2}} e^{i(\omega t - \varphi(z))}\{-i \cos \Delta(x + y) - \sin \Delta(x - y)e^{2i\theta}\} \qquad (6)$$

indicated as $E_1$ and $E_2$ in FIG. 2. $E_2$, having a polarization parallel to the input polarization at stage 18, is phase dependent on $2\theta$ while $E_1$, normal to the input polarization, is independent of $\theta$. Proper orientation of polarization selective stage 21 in FIG. 1 will completely remove $E_2$ from the cavity, while permitting $E_1$ to remain therein and be reflected from reflector 13 back through the modulator 11, prism 17, and active medium 10.

Element 19 can advantageously comprise such cubic crystals as gallium arsenide, cuprous chloride, gallium phosphide, or hexamethylene tetramine; or a uniaxial crystal such as lithium metaniobate or quartz. The threefold axis of such crystals is oriented along the z axis of propagation, with the modulating voltage applied in the x and y directions. Thus, in FIG. 2, modulating voltage $v_1$, applied along x, is $E_m \cos \omega_m t$ and $v_2$, applied along y, is $E_m \sin \omega_m t$. Such an applied field of constant amplitude produces a constant amount of birefringence for energy propagating along z. Thus the relative phase delay introduced by stage 19 is also constant. However, the simultaneous application of modulation voltages $v_1$ and $v_2$ causes the axes of constant birefringence to rotate at half the rate of rotation of the field, or $\omega_m/2$. As set out in Equation 6, the phase of the modulated component is directly proportional to $2\theta$, where $\theta$ measures the angle through which the axes of the rotating birefringent section 19 revolve. Thus, for a modulating field rotation $\omega_m$, the phase delay axes rotate at $\omega_m/2$ and the modulated component is shifted $2\cdot(\omega_m/2)$ or $\omega_m$ in frequency.

Recapitulating now with reference to FIG. 1, polarization selective stage 17 is oriented to pass a wave having a polarization determined by the Brewster angle windows 15, 16 of tube 14. For energy propagating to the right, the linearly polarized wave energy passes successively through a quarter wave plate 18, a $2\Delta$ relative phase delay section 19 with rotating axes of birefringence, and a second quarter wave plate 20. Polarization selective stage 21 is oriented to remove the resultant polarization having an amplitude $\sin \Delta$ and phase angle $2\theta$ and leave the wave of amplitude $\cos \Delta$ in the cavity. Energy traveling to the left is similarly affected by modulator 11, with stage 17 removing the amplitude $\sin \Delta$, angle $(-2\theta)$ component and transmitting the $\cos \Delta$ polarization component which passes through active medium 10.

An alternative internal modulation arrangement is shown in FIG. 3 in which one of the polarization selectors and one of the quarter wave plates of FIG. 1 have been replaced by a 45 degree Faraday rotator. In FIG. 3, energy traveling to the right of laser 30 within the cavity formed by reflectors 31, 32 is linearly polarized by windows 33, 34 and prism 35 and is rotated 45 degrees in one sense by Faraday rotation device 36, which is supplied by source 37 through solenoidal winding 38 with a magnetic field in a direction parallel to the propagation direction. Faraday rotator 36 can comprise a crystal of terbium aluminum garnet or gallium phosphide, or it can comprise a chromium trihalide crystal as disclosed in the copending application of J. F. Dillon, Jr., Ser. No. 206,102, filed June 28, 1962, and assigned to the assignee of this application. A quarter wave plate 39, similar to those disclosed in FIG. 1, is oriented with its axes at 45 degrees to the polarization of the incident energy. The resultant circularly polarized wave, which emerges from plate 39, is then twice incident upon the rotating birefringent section 40; once traveling to the right toward reflector 32 and a second time upon reflection therefrom. The $2\Delta$ relative phase delay section 40 and the spacing $d$ between it and reflector 32 must be short in order that the travel time of the wave energy through the delay section and back is less than one modulating period.

Emerging from section 40, and traveling to the left, is then a first circularly polarized component of amplitude $\cos 2\Delta$ with a phase independent of the rotation angle $\theta$ of section 40; and an oppositely rotating component of amplitude $\sin 2\Delta$ with a phase angle $2\theta$. Passage through quarter wave plate 39 produces orthogonal ($\cos 2\Delta$) and ($\sin 2\Delta$, angle $2\theta$) linear polarizations which are each rotated 45 degrees by section 36. The ($\cos 2\Delta$) polarization is transmitted by prism 35 while ($\sin 2\Delta$, angle $2\theta$) polarization is deflected by it out of the cavity. Advantages of the embodiment of FIG. 3 include a single port for output energy and the doubled effect of two traversals of the rotating birefringent phase delay section.

FIGS. 4 and 5 illustrate additional embodiments of the invention in which the number of modulation elements per laser tube is reduced over the arrangements of FIGS. 1 and 3.

In FIG. 4, polarization selective prisms 42, 43 are interposed within the cavity formed by reflectors 44, 45 between internal modulator 46 and lasers 47, 48. As before described, lasers 47, 48 are configured with Brewster angle ends, and can comprise either gaseous or solid media. Modulator 46 comprises quarter wave plates 49 flanking 2Δ phase delay section 50 having rotating axes of birefringence. In operation, modulated energy is coupled via prisms 42, 43 from the resonator on each pass through modulator 46, with total amplification of the remaining energy being doubled due to the presence of two laser tubes.

Increased power levels are also present in the embodiment of FIG. 5 in which the laser cavity is folded, with the resultant elimination of one quarter wave plate. In FIG. 5 wave energy generated, for example, in laser 52 and reflected from mirror 53 passes through polarization selective prism 54, quarter wave plate 55, and $2\Delta$ phase delay section 56; and is reflected at mirror 57. After reflection, the energy again traverses section 56 and quarter wave plate 55 and thence to prism 58, which deflects the modulated component from the cavity, while simultaneously transmitting undeviated the unmodulated component which then propagates to and through amplifying laser 59 to mirror 60 from which the energy is reflected back into the system. On the return trip the modulated component is deviated from the cavity at prism 54.

In practice, the angle $\alpha$ is made very small to minimize off axis energy components. If desired, single quarter wave plate 55 can be removed from $2\Delta$ section 56, with one such plate being disposed in each arm of the folded cavity.

In all cases, it is to be understood that the above-described arrangements are illustrative of but a small number of the many specific embodiments which can represent the application of the principles of the invention. Numerous and varied other embodiments can readily be devised in accordance with these principles by those skilled in the art without departing from the spirit and scope of the invention.

What is claimed is:
1. In combination, a cavity defined by a pair of end reflectors; an active medium disposed within said cavity, said cavity being supportive of a beam of electromagnetic wave energy;
   polarization selective means within said cavity for polarizing said beam in a first direction;
   modulating means within said cavity for phase modulating a portion of said beam comprising: a first polarization converter for converting linearly polarized wave energy to circularly polarized wave energy, a differential phase shifter having rotating axes of birefringence, said phase shifter introducing less than 180 degree relative phase delay, and a second polarization converter for converting circularly polarized wave energy to linearly polarized wave energy;
   and polarization selective means disposed between said modulator and said one reflector for extracting from said cavity phase modulated wave energy in a given polarization.

2. An optical modulator comprising
   an optical cavity defined by a pair of end reflectors and having an axis,
   a source of linearly polarized optical frequency wave energy disposed within said cavity,
   first and second reciprocal means for converting wave energy between linear and circular polarization states disposed within said cavity along said axis,
   a rotating birefringent section having a small constant differential phase delay interposed between said conversion means,
   and means for coupling from said cavity energy having a polarization plane orthogonal to the polarization of said source.

3. An optical modulator comprising
a negative temperature medium disposed within an optically resonant cavity;
said cavity being supportive of a beam of linearly polarized wave energy;
a modulator for said energy disposed within said cavity and comprising:
a first quarter wave plate having principal axes at 45 degrees to the polarization plane of said energy;
a rotating birefringent section having a differential phase delay less than 180 degrees;
and a second quarter wave plate having principal axes at 45 degrees for said plane;
and means for coupling energy having a polarization plane orthogonal to said given plane for said cavity.

4. In combination
an optical cavity,
a source of wave energy of a given polarization disposed within said cavity,
means disposed within said cavity for converting a portion of said energy into phase modulated components in a polarization normal to said given polarization,
said converting means comprising the combination of a polarization converter and a section having rotating axes of constant birefringence,
and means for coupling said components from said cavity.

5. The combination according to claim 4 in which a Faraday rotation device is disposed within said cavity between said converting means and said coupling means.

6. An optical modulator comprising
an optical cavity defined by a plurality of energy reflectors with a central axis of propagation of energy therebetween,
means for directing a beam of linearly polarized optical frequency wave energy along said axis,
reciprocal means for converting wave energy between linear an circular polarization states disposed within said cavity along said axis,
a rotating birefringent section characterized by a small constant differential phase delay interposed within said cavity,
and means for coupling from said cavity energy having a polarization plane orthogonal to the polarization of said source.

7. The modulator in accordance with claim 6 in which a Faraday rotation device is disposed along said axis.

References Cited
UNITED STATES PATENTS

| | | | |
|---|---|---|---|
| 3,239,671 | 3/1966 | Buhrer | 250—199 |
| 3,267,804 | 8/1966 | Dillon | 331—94.5 X |
| 3,272,988 | 9/1966 | Bloom et al. | 250—199 |

OTHER REFERENCES

Chang et al.: "Optical Faraday Rotation and Microwave Interactions in Paramagnetic Salts," Applied Optics, May 1962, vol. 1, No. 3, pp. 329–333.

Buhrer et al.: "Electro-Optic Light Modulation With Cubic Crystals," Applied Optics, August 1963, vol. 2, No. 8, pp. 839–846.

Di Domenico: "Small-Signal Analysis of Internal (Coupling-Type) Modulation of Lasers," Jour. of Applied Physics, vol. 35, No. 10, October 1964, pp. 2870–2876.

ALFRED L. BRODY, *Primary Examiner.*